US008639264B2

(12) United States Patent
Valletta et al.

(10) Patent No.: US 8,639,264 B2
(45) Date of Patent: Jan. 28, 2014

(54) ENHANCED INDOOR LOCALIZATION

(75) Inventors: Damiano Valletta, Rome (IT); Cristiano Monti, Rome (IT); Paolo Bellofiore, Rome (IT)

(73) Assignee: Telespazio S.p.A., Rome (IT)

( * ) Notice: Subject to any disclaimer, the term of this patent is extended or adjusted under 35 U.S.C. 154(b) by 152 days.

(21) Appl. No.: 13/061,246

(22) PCT Filed: Aug. 29, 2008

(86) PCT No.: PCT/EP2008/061444
§ 371 (c)(1),
(2), (4) Date: Jun. 30, 2011

(87) PCT Pub. No.: WO2010/022797
PCT Pub. Date: Mar. 4, 2010

(65) Prior Publication Data
US 2011/0250904 A1    Oct. 13, 2011

(51) Int. Cl.
*H04W 24/00* (2009.01)
(52) U.S. Cl.
USPC ............... 455/456.1; 455/456.5; 455/456.6
(58) Field of Classification Search
USPC ............................. 455/456.1, 456.5, 456.6
See application file for complete search history.

(56) References Cited

U.S. PATENT DOCUMENTS

| | | | | |
|---|---|---|---|---|
| 7,047,014 B1 * | 5/2006 | Friday et al. | ............... | 455/446 |
| 7,317,419 B2 * | 1/2008 | Sugar et al. | ............... | 342/464 |
| 7,768,420 B2 * | 8/2010 | Neogi et al. | ............... | 340/12.53 |
| 7,808,958 B1 * | 10/2010 | Hernacki et al. | ............... | 370/338 |
| 2003/0064735 A1 * | 4/2003 | Spain et al. | ............... | 455/456 |
| 2004/0259575 A1 * | 12/2004 | Perez-Breva et al. | ...... | 455/456.5 |
| 2005/0124354 A1 | 6/2005 | Durgin | | |
| 2005/0261004 A1 * | 11/2005 | Dietrich et al. | ............ | 455/456.2 |
| 2007/0133487 A1 * | 6/2007 | Wang et al. | ............... | 370/338 |
| 2009/0247185 A1 * | 10/2009 | Gilad et al. | ............... | 455/456.1 |
| 2010/0016073 A1 * | 1/2010 | Goldstein et al. | ............... | 463/29 |
| 2010/0189082 A1 * | 7/2010 | Choi et al. | ............... | 370/336 |
| 2013/0045754 A1 * | 2/2013 | Markhovsky et al. | ..... | 455/456.1 |

FOREIGN PATENT DOCUMENTS

WO    WO 2007/022005 A2    2/2007

OTHER PUBLICATIONS

PCT International Search Report and Written Opinion dated May 28, 2009.

* cited by examiner

*Primary Examiner* — Lester Kincaid
*Assistant Examiner* — Mehmood B Khan
(74) *Attorney, Agent, or Firm* — McCarter & English, LLP

(57) ABSTRACT

An indoor localization system for locating an electronic mobile device within an indoor environment is provided. The indoor localization system includes a plurality of transmitting nodes arranged in different positions within the indoor environment and configured to transmit RF signals. An electronic mobile device is configured to receive the RF signals from the transmitting nodes. The indoor localization system is configured to operate in a training mode, wherein reference quantities are computed based on powers of the RF signals received from the transmitting nodes in different reference positions within the indoor environment. The indoor localization system is further configured to operate in a locating mode, wherein current quantities are computed based on powers of the RF signals received by the electronic mobile device in its current location within the indoor environment from the transmitting nodes, and wherein the current location of the electronic mobile device is determined based on the current and the reference quantities. The indoor localization system is configured to operate based on RF signals over at least two different radio channels.

17 Claims, 4 Drawing Sheets

ENHANCED INDOOR LOCALIZATION

TECHNICAL FIELD OF THE INVENTION

The present invention relates, in general, to localization in indoor environments and, in particular, to an indoor Radio-Frequency-based localization system.

BACKGROUND ART

As is known, in the recent past the need for more and more reliable localization systems has been more and more felt.

Consequently, many localization systems designed to determine or track users' position have been proposed over the years.

The localization systems can be divided into three main categories: global location systems, wide-area location systems based on cellular networks, and indoor location systems.

A typical global location system is the Global Positioning System (GPS), which exploits signals from multiple satellites to perform a multilateration process in order to determine locations with an accuracy of approximately 5 m. However, GPS is inefficient for indoor use or in urban areas where high buildings shield the satellite signals, i.e. in deep indoor conditions.

On the other hand, cellular-network-based wide-area location systems, generally, are based on measuring signal strengths to know the distance between a user terminal and a base station. However, the accuracy of wide-area location systems is highly limited by the cell size. Moreover, the effectiveness of these systems for an indoor environment is also limited by multiple reflections suffered by the radio frequency (RF) signal, which cause, for instance, multipath and shadowing phenomena.

Finally, indoor location systems are just designed to perform localization in indoor environments. Several indoor location systems based on various technologies, such as infrared (IR), ultrasound, video surveillance, and RF signal, have been proposed over the year. Among these systems, RF-based approaches have obtained great attention in recent years because RF-based localization systems have distinct advantages in indoor environments over all other systems.

In fact, an RF-based localization system is a low cost solution and covers a large area compared with other types of indoor location systems. Indeed, an RF-based localization system may work in a large building or even across many buildings.

Furthermore, an RF-based localization system is a stable system owing to its robust RF signal propagation, contrary to video- or IR-based location systems which are subject to restrictions, such as line-of-sight limitations or poor performance with fluorescent lighting or in direct sunlight.

Typical RF-based localization systems exploit Wireless Fidelity (Wi-Fi) systems, i.e. based on IEEE 802.11 standard, as well as other wireless systems, such as Wireless Sensor Networks, Bluetooth-based networks etc.

In fact, generally, an RF-based localization system for an indoor environment comprises an RF transmitting node network, such as a WiFi network, comprising a plurality of RF transmitting nodes, such as typical access points, arranged within the indoor environment and configured to transmit respective RF signals over a single radio channel. The RF-based localization system further comprises at least an electronic mobile device, such as a laptop or a palmtop, which is to be located within the indoor environment. The electronic mobile device is configured to receive the RF signals from the RF transmitting nodes over the single radio channel.

Generally, the localization of the electronic mobile device performed by the RF-based localization systems is based on Received Signal Strength (RSS) approach, which refers to a known technique according to which electronic mobile device's location within the indoor environment is estimated by comparing a current received signal strength fingerprint with stored reference signal strength fingerprints.

The general philosophy of the RSS approach is to establish a one-to-one correspondence between a given position and the mean signal strength received in that given position from the RF transmitting nodes.

In detail, the RF-based localization systems needs to be trained before performing the localization of the electronic mobile device. Accordingly the localization process comprises two main phase:

a training phase, wherein mean powers of the RF signals received from the RF transmitting nodes over the single radio channel are computed in reference positions and inserted into an RF database to create an RF map of the indoor environment, the RF map containing reference signal strength fingerprints in the reference positions; and an online phase, wherein the electronic mobile device to be located computes current powers of the RF signals received in its location within the indoor environment from the RF transmitting nodes over the single radio channel, and then compares the current powers with all tuples of the RF database to select that reference position of the RF map which is closer in terms of received power.

The RF map is organized as an array wherein each row refers to the powers of the RF signals received in a corresponding reference position from the RF transmitting nodes, each of them indexing one column of the array.

Once the electronic mobile device has computed the current powers of the RF signals received from the RF transmitting nodes and it has formed with those current powers a corresponding current power vector, it compares this current power vector with all the rows of the RF map in order to find the closest match.

Comparing is normally based on an Euclidean distance between the current power vector and each row of the RF map so that the electronic mobile device is located in that reference position whose corresponding row in the RF map has the smallest Euclidean distance from the current power vector.

OBJECT AND SUMMARY OF THE INVENTION

The Applicant has noticed that the known RF-based localization systems suffer from several problems mainly due to variability of the RF signal.

In particular, fading can affect RF signal strength causing time and space variability of the RF signal which may lead to an inexact current power estimation.

In turn, an inexact current power estimation may lead to select a wrong tuple of the RF database thus resulting in a wrong localization of the electronic mobile device.

Moreover, other several issues affect the RF signal strength from the point of view of its variability.

For instance, a symmetric topology of the indoor environment or a symmetric distribution of the RF transmitting nodes may result in several tuples of the RF database having the same values of the RSS and thence may lead to couple those several tuples of the RF database with the current powers computed by the electronic mobile device, thus resulting in a completely wrong estimated location of the electronic mobile device.

Furthermore, from the point of view of time variability, if the current powers are not opportunely averaged, their association with the tuples of the RF database may be wrong thus leading bad accuracy in the estimation of the electronic mobile device's location.

Finally, the location estimation accuracy of the known RF-based localization systems also depends on many other factors, such as radio propagation characteristics of the indoor environment and number of the RF transmitting nodes.

For instance, moving persons and closed or opened doors may produce a rapid change of the radio propagation characteristics of the indoor environment thus leading to a significant variation of the current powers measured by the electronic mobile device from the powers stored in the RF map.

A first objective of present invention is then to provide an RF-based localization system for an indoor environment which, in general, can alleviate at least in part the above cited problems, and, in particular, suffers less from the variability of the RF signal than the known RF-based localization systems.

Another objective of present invention is to provide an RF-based localization system for an indoor environment which enhances accuracy of estimation of electronic mobile device's location within the indoor environment with respect to the known RF-based localization systems which generally achieve an accuracy of about 3 m.

These and other objectives are achieved by the present invention in that it relates to an indoor localization system, as defined in the appended claims.

According to the present invention an indoor localization system for locating an electronic mobile device within an indoor environment is proposed, the indoor localization system comprising a plurality of transmitting nodes arranged in different positions within the indoor environment and configured to transmit RF signals; the electronic mobile device being configured to receive the RF signals from the transmitting nodes; the indoor localization system being configured to operate in:
- a training mode, wherein reference quantities are computed based on powers of the RF signals received from the RF transmitting nodes in different reference positions within the indoor environment; and
- a locating mode, wherein current quantities are computed based on powers of the RF signals received by the electronic mobile device in its current location within the indoor environment from the RF transmitting nodes, and wherein the current location of the electronic mobile device is determined based on the current and the reference quantities;

the indoor localization system being characterized in that it is configured to operate based on RF signals over at least two different radio channels.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed.

Thus, the present invention is not intended to be limited just to the embodiments shown, but is to be accorded the widest scope consistent with the principles and features disclosed herein and defined in the appended claims.

The present invention stems from an intuition had by the Applicant about exploiting different radio channels to better characterize radio propagation in a generic indoor environment.

In fact, the Applicant has carried out an extensive investigation on signal propagation in indoor environments which has led to observe that transmitting within an indoor environment signals over different radio channels, each radio channel being characterized by a respective carrier distinct from the carriers of the other radio channels, causes the signals to propagate in different ways and to be received with different characteristics even if transmitted with a constant power level. In extreme cases, a signal transmitted over a radio channel may not be received by a receiver, while the same signal transmitted over a different radio channel is received.

Therefore, using different radio channels to transmit the same signal allows to diversify power measurements in a given position thus improving accuracy of estimation of location within indoor environments and allowing to overcome RF signal variability issues.

Figure 1:
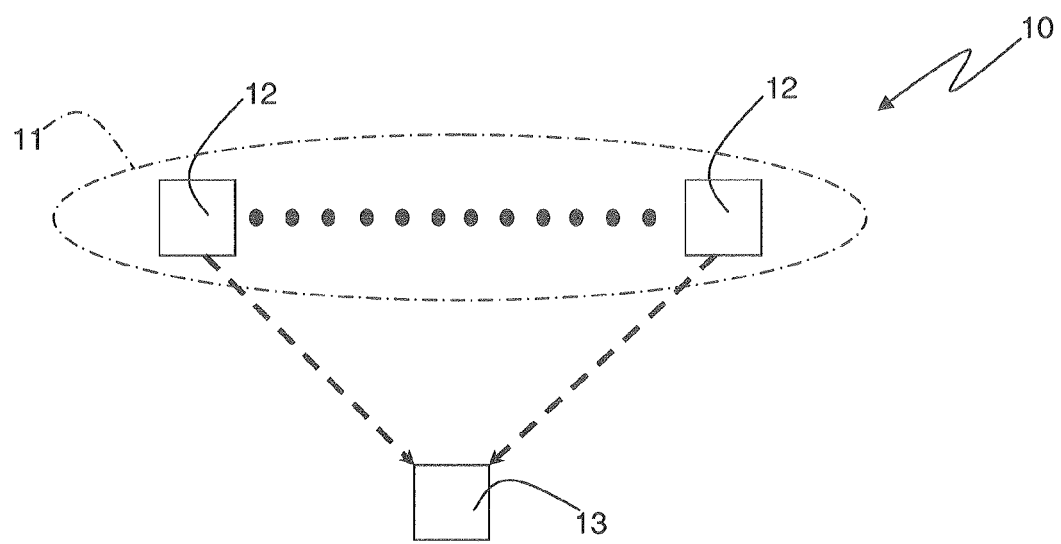
FIG. 1 shows schematically an indoor localization system according to the present invention.

In particular, FIG. 1 shows schematically an indoor localization system 10 according to the present invention.

In detail, the indoor localization system 10 comprises an RF transmitting node network 11 comprising a plurality of RF transmitting nodes 12 arranged in different positions within the indoor environment and configured to transmit RF signals over at least two different radio channels.

The indoor localization system 10 further comprises at least an electronic mobile device 13 to be located within the indoor environment, the electronic mobile device 13 being configured to receive the RF signals from the RF transmitting nodes 12 over the at least two different radio channels.

Moreover, the indoor localization system 10 is configured to operate in:
- a training mode, wherein reference quantities are computed based on powers of the RF signals received in different known reference positions within the indoor environment from the RF transmitting nodes 12 over the at least two different radio channels; and a locating mode, wherein current quantities are computed based on powers of the RF signals received by the electronic mobile device 13 in its current location within the indoor environment from the RF transmitting nodes 12 over the at least two different radio channels, and wherein the current location of the electronic mobile device 13 is determined based on the current and the reference quantities.

The reference quantities may conveniently be either averaged powers or instantaneous powers of the RF signals received in the different known reference positions from the RF transmitting nodes 12 over the at least two different radio channels.

Moreover, also the current quantities may conveniently be either averaged powers or instantaneous powers of the RF signals received by the electronic mobile device 13 in its current location within the indoor environment from the RF transmitting nodes 12 over the at least two different radio channels.

Preferably, in the locating mode
the current quantities are compared with the reference quantities in order to determine at least one known reference position in which the corresponding reference quantities meet a given relation with the current quantities; and
the current location of the electronic mobile device 13 is determined based on the at least one determined known reference position.

Conveniently, in the training mode an RF map of the indoor environment is created and stored, the RF map comprising for each known reference position corresponding reference quantity vectors, each of them comprising the reference quantities computed based on the powers of the RF signals received in the known reference position from the RF transmitting nodes 12 over a corresponding radio channel.

Therefore, in the RF map number of the reference quantity vectors for each known reference position is equal to number of the different radio channels exploited by the indoor localization system 10.

Accordingly, in the locating mode
current quantity vectors are formed, each of them comprising the current quantities computed based on the powers of the RF signals received by the electronic mobile device 13 in its current location within the indoor environment from the RF transmitting nodes 12 over a corresponding radio channel;
at least one known reference position whose corresponding reference quantity vectors meet a given relation with the current quantity vectors is determined; and
the current location of the electronic mobile device 13 is determined based on the at least one determined known reference position.

Therefore, number of the current quantity vectors formed for the current location of the electronic mobile device 13 is equal to the number of the different radio channels exploited by the indoor localization system 10.

Moreover, according to a first embodiment of the present invention, the electronic mobile device 13 is configured to:
compute the reference quantities in the training mode;
store the reference quantities in the training mode;
compute the current quantities in the locating mode; and
determine its current location based on the current and the reference quantities in the locating mode.

Conveniently, according to the first embodiment of the present invention, the electronic mobile device 13 is further configured to:
in the training mode, create and store the RF map;
in the locating mode, form the current quantity vectors;
in the locating mode, determine the at least one known reference position whose corresponding reference quantity vectors meet the given relation with the current quantity vectors; and
in the locating mode, determine its current location based on the at least one determined known reference position.

Figure 2:
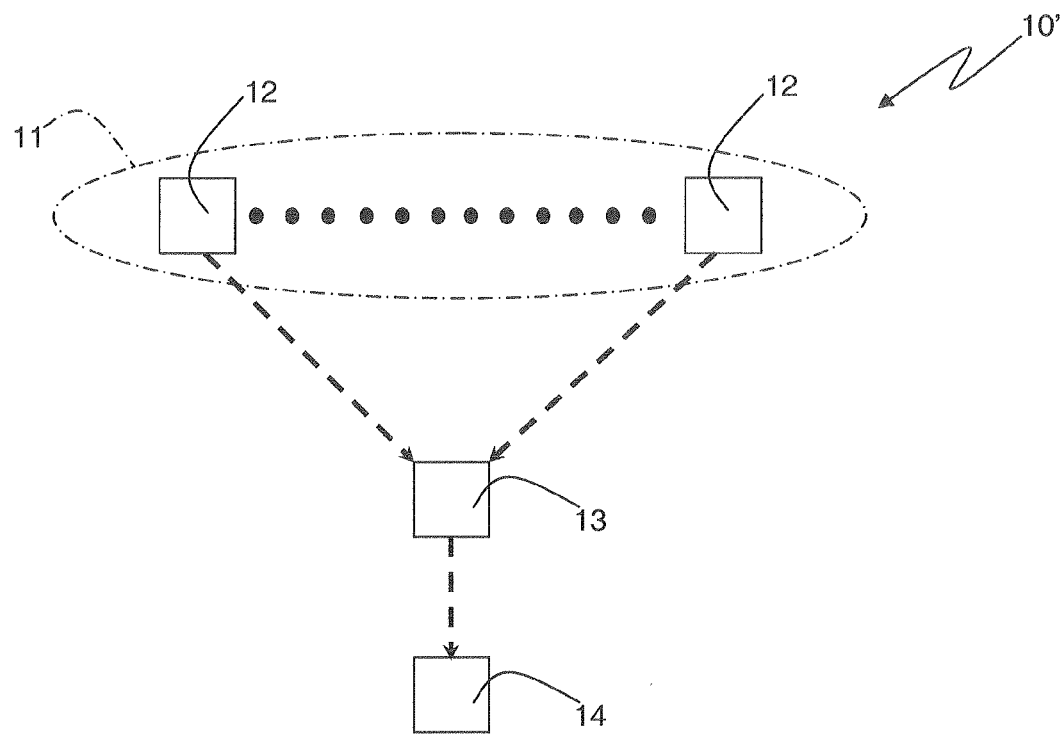
FIG. 2 shows schematically a different embodiment of the indoor localization system according to the present invention.

Alternatively, FIG. 2 shows a second embodiment of the present invention wherein an indoor localization system 10' differs from the indoor localization system shown in FIG. 1 in that it further comprises a central processing unit 14.

As shown in FIG. 2, the electronic mobile device 13 is coupled to the central processing unit 14 and is configured to provide the central processing unit 14 with the reference quantities in the training mode and with the current quantities in the locating mode.

According to the second embodiment, the central processing unit 14 is configured to:
store the reference quantities in the training mode; and
determine the current location of the electronic mobile device 13 based on the current and the reference quantities in the locating mode.

Conveniently, according to the second embodiment of the present invention, the central processing unit 14 is further configured to:
in the training mode, create and store the RF map;
in the locating mode, form the current quantity vectors;
in the locating mode, determine the at least one known reference position whose corresponding reference quantity vectors meet the given relation with the current quantity vectors; and
in the locating mode, determine the current location of the electronic mobile device 13 based on the at least one determined known reference position.

Conveniently, the RF map is created based on a database which stores each reference quantity in a corresponding tuple, number of the reference quantities, and thence number of the tuples, being equal to $N_{KRP}*N_{RC}*N_{RFTN}$, wherein $N_{KRP}$ is number of the known reference positions, $N_{RC}$ is the number of the different radio channels exploited by the indoor localization system 10 or 10', and $N_{RFTN}$ is number of the RF transmitting nodes 12.

In detail, each tuple stores:
a corresponding reference quantity;
an identity of the RF transmitting node 12 which has transmitted the at least one RF signal based on which the corresponding reference quantity has been computed;
an indicator of the radio channel over which has been received the at least one RF signal based on which the corresponding reference quantity has been computed; and
spatial coordinates of the known reference position in which has been received the at least one RF signal based on which the corresponding reference quantity has been computed.

Moreover, the at least one known reference position whose corresponding reference quantity vectors meet the given relation with the current quantity vectors may be conveniently determined identifying at least one known reference position whose corresponding reference quantity vectors are a close match with the current quantity vectors.

In turn, identifying the at least one known reference position whose corresponding reference quantity vectors are a close match with the current quantity vectors may be conveniently based on computing for each known reference position at least a distance between the current quantity vectors and the reference quantity vectors corresponding to the known reference position.

Preferably, computing for each known reference position at least a distance may be based on an Euclidean metric.

Conveniently, computing for each known reference position at least a distance based on the Euclidean metric comprises computing a number of Euclidean distances equal to the number of the different radio channels $N_{RC}$, the i-th Euclidean distance, with i obviously comprised between 1 and $N_{RC}$, being computed between the i-th current quantity vector, i.e. the power vector comprising the current quantities computed based on the powers of the RF signals received over the i-th radio channel, and the i-th reference quantity vector corresponding to the known reference position, i.e. the reference quantity vector comprising the reference quantities computed based on the powers of the RF signals received in the known reference position over the i-th radio channel.

Moreover, at this point, the current location of the electronic mobile device 13 may be determined according to four different localization approaches.

According to a first localization approach, the current location of the electronic mobile device 13 is estimated to be that known reference position for which is computed the smallest Euclidean distance among all the computed Euclidean distances.

According to a second localization approach, for each known reference position a distance indicator parameter is computed based on the Euclidean distances computed for the known reference position, and the current location of the electronic mobile device 13 is estimated to be that known reference position for which is computed the smallest distance indicator parameter among all the computed distance indicator parameters.

Conveniently, the distance indicator parameter may be the sum of all the Euclidean distances computed for the known reference position.

Moreover, according to a third localization approach, a first subset of the known reference positions is identified, the known reference positions belonging to the first subset being those known reference positions for which are computed the smallest Euclidean distances among all the computed Euclidean distances.

In other word, the K1 known reference positions which are coupled to the smallest Euclidean distances among the Euclidean distances computed for all the known reference positions are identified and then included in the first subset, K1 being an integer number greater than 1.

Then, the current location of the electronic mobile device 13 is estimated to be the geographic centroid of the known reference positions belonging to the first subset.

Finally, according to a fourth localization approach, for each known reference position a distance indicator parameter is computed based on the Euclidean distances computed for the known reference position, and a second subset of the known reference positions is identified, the known reference positions belonging to the second subset being those known reference positions for which are computed the smallest distance indicator parameters among all the computed distance indicator parameters.

In other word, the K2 known reference positions having the smallest distance indicator parameters among the distance indicator parameters computed for all the known reference positions are identified and then included in the second subset, K2 being an integer number greater than 1.

Conveniently, the distance indicator parameter may be the sum of all the Euclidean distances computed for the known reference position.

Then, the current location of the electronic mobile device 13 is estimated to be the geographic centroid of the known reference positions belonging to the second subset.

As is known, spatial coordinates $(x_B, y_B, z_B)$ of a geographic centroid of K positions $P_i(x_i, y_i, z_i)$ are computed as follows:

$$x_B = \frac{1}{K}\sum_{i=1}^{K} x_i,$$

$$y_B = \frac{1}{K}\sum_{i=1}^{K} y_i,$$

$$z_B = \frac{1}{K}\sum_{i=1}^{K} z_i.$$

Figure 3:
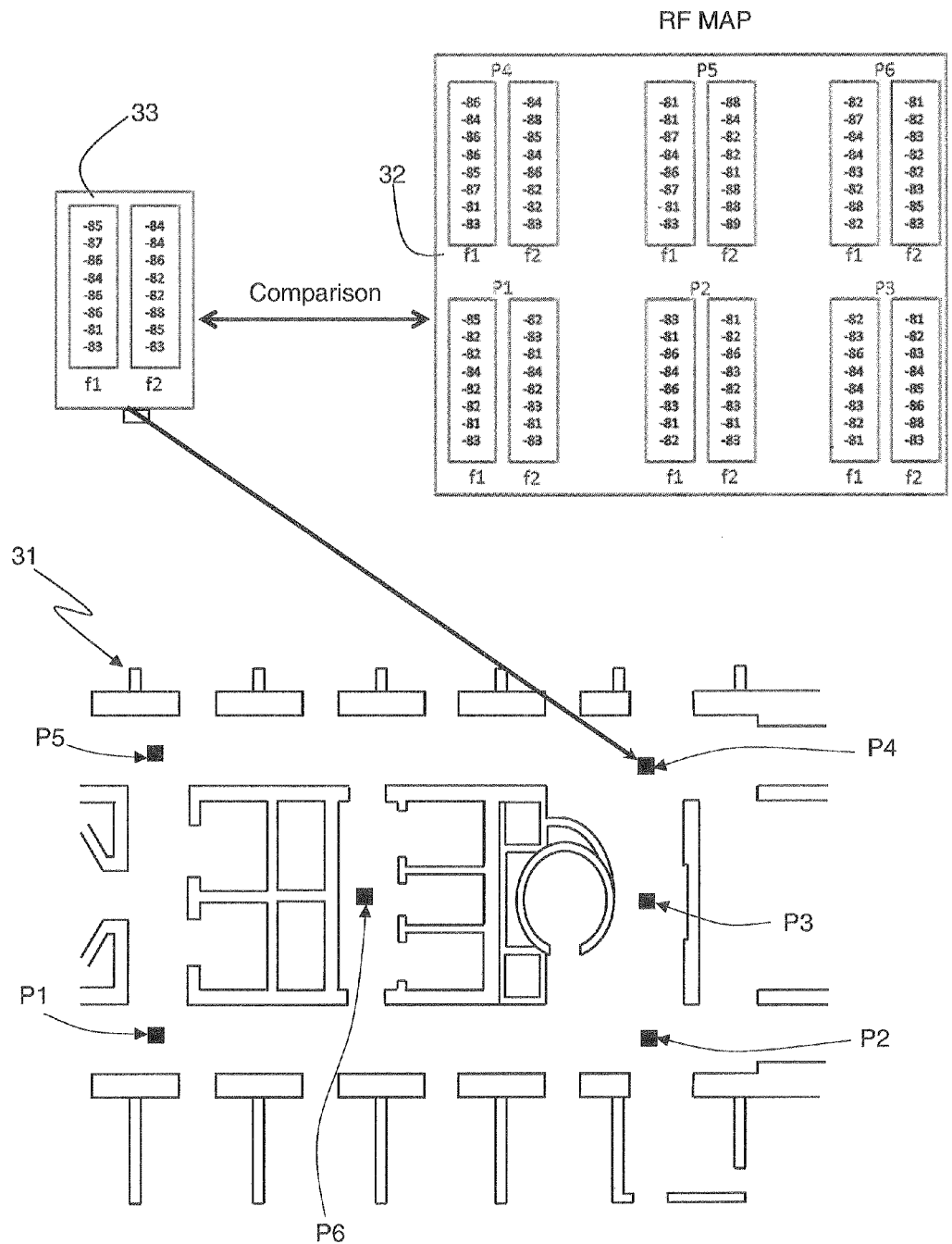
FIG. 3 shows schematically an example of localization carried out by the indoor localization system according to the present invention.

FIG. 3 shows an example of localization carried out by the indoor localization system according to the present invention.

In detail, the FIG. 3 shows an indoor environment 31 coupled to the indoor localization system (not shown) according to the present invention which exploits two different radio channels to locate an electronic mobile device (not shown) which is within the indoor environment 31, a first radio channel of the two different radio channels corresponding to a first frequency f1 and a second radio channel corresponding to a second frequency f2.

Moreover, as shown in FIG. 3, within the indoor environment 31 there are six known reference positions, respectively P1, P2, P3, P4, P5 and P6.

Along with the indoor environment 31, the FIG. 3 also shows an RF map 32 created and stored by the indoor localization system, the RF map 32 comprising for each one of the six known reference positions P1, P2, P3, P4, P5 and P6 two corresponding reference quantity vectors each comprising the reference quantities computed based on the powers of the RF signals received in the considered known reference position from the RF transmitting nodes over a corresponding radio channel.

Furthermore, the FIG. 3 also shows two current quantity vectors 33 each comprising the current quantities computed based on the powers of the RF signals received by the electronic mobile device in its current location within the indoor environment 31 from the RF transmitting nodes over a corresponding radio channel.

Based on a comparison between the current quantity vectors 33 and the RF map 32 the indoor localization system locates the electronic mobile device in the known reference position P4 because the reference quantity vectors corresponding to the known reference position P4 are the closest match with the current quantity vectors 33.

Figure 4:
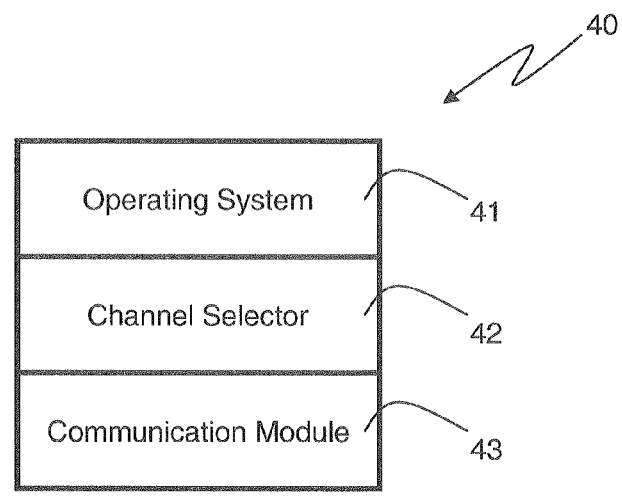
FIG. 4 shows in the abstract a stack structure schematically representing conceptual architecture of two components of the indoor localization system according to the present invention.

Moreover, FIG. 4 shows in the abstract a stack structure 40 schematically representing conceptual architecture of the RF transmitting nodes 12 and of the electronic mobile device 13.

In detail, as shown in FIG. 4, the stack structure 40 comprises:
  an operating system 41 in the top layer of the stack structure 40;
  a channel selector 42 in the middle layer of the stack structure 40; and
  a communication module 43 in the bottom layer of the stack structure 40.

In particular, the channel selector 42 is configured to dynamically select one radio channel to transmit and/or to receive among the at least two different radio channels exploited by the indoor localization system according to the present invention.

The channel selector 42 can be software-implemented or hardware-implemented, and can interact via software and/or hardware with the communication module 43 in order to transmit/receive over the selected radio channel for a given time period.

Conveniently, both the channel selectors 42 of the RF transmitting nodes 12 and the channel selector 42 of the electronic mobile device 13 have one and the same pattern of selection of the different radio channels and are always synchronized on the same selected radio channel.

Alternatively, the channel selector 42 of the electronic mobile device 13 select, and thence the electronic mobile device 13 receives over, each radio channel for a listening time $T_L$ long enough to allow the channel selectors 42 of the RF transmitting nodes 12 to select, and thence the RF transmitting nodes 12 to transmit over, that radio channel selected by the channel selector 42 of the electronic mobile device 13, and the electronic mobile device 13 to collect a sufficient number of power measurements.

In particular, the listening time $T_L$ may be defined as:

$$T_L = N_{RC} * T_T$$

wherein $N_{RC}$ is the number of the different radio channels exploited by the indoor localization system 10 or 10', and $T_T$ is the time of transmission of the RF transmitting nodes 12 over each radio channel.

Figure 5:
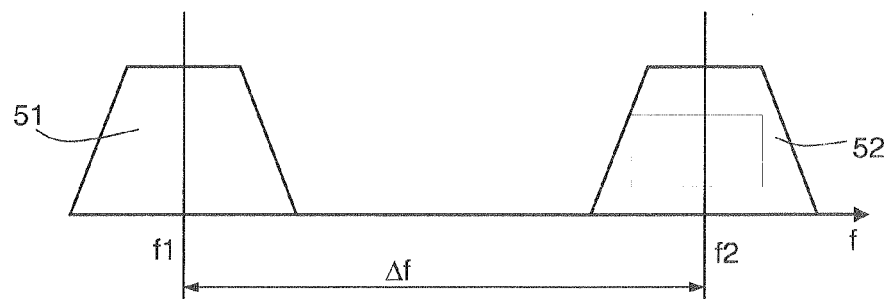
FIG. 5 shows schematically an example of two different radio channels.

FIG. 5 shows schematically an example of two different radio channels with a frequency separation Δf.

In detail, FIG. 5 shows a first radio channel 51 at a first frequency f1 and a second radio channel 52 at a second frequency f2 separated each other by the frequency separation Δf which is equal to f2-f1.

The indoor localization system according to the present invention may be advantageously realized by means of different technologies, such as Wi-Fi, Bluetooth, ZigBee or Ultra Wide-Band (UWB).

Moreover, the Applicant ha carried out an in-depth testing in order to evaluate performances of the indoor localization system according to the present invention.

In particular, the indoor localization system has been realized by means of wireless sensor network technology.

In detail, a wireless sensor network consists of miniaturized and low-power intelligent transceivers which can play both the role of transmitters and the role of receivers at the same time.

The Applicant has used, as electronic mobile device to be located and as RF transmitting nodes, transceivers based on IEEE 802.15.4 standard which allows to dynamically select one radio channel among sixteen available radio channels in the band 2.4-2.4835 GHz.

Figure 6:
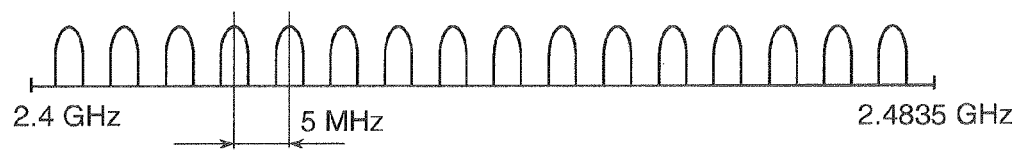
FIG. 6 shows IEEE 802.15.4 radio channels in the band 2.4-2.4835 GHz.

In particular, FIG. 6 shows schematically the sixteen IEEE 802.15.4 radio channels in the band 2.4-2.4835 GHz, i.e. from IEEE 802.15.4 radio channel 11 to IEEE 802.15.4 radio channel 26.

Conveniently, the transceivers acting as the RF transmitting nodes are wall-mounted in known positions, each RF transmitting node being configured to broadcast RF signals over the IEEE 802.15.4 radio channels 11, i.e. at the 2.405 GHz frequency, and 26, i.e. at the 2.480 GHz frequency.

In particular, preferably, each RF transmitting node sends a message every 100 ms with a power of 3 dbm over one of the two IEEE 802.15.4 radio channels 11 and 26, and then switches on the other IEEE 802.15.4 radio channel. This procedure is repeated cyclically.

An example of structure of the messages sent by the RF transmitting nodes is shown in the following table:

| $T_x$ ID | Radio Channel Number | Sequence Number |
|---|---|---| wherein
field $T_x$ ID contains identity of the RF transmitting node which transmits the message, the identity being conveniently encoded by eight bits;
field Radio Channel Number contains a radio channel number which indicates the radio channel over which the message is transmitted and thence received, the radio channel number being conveniently encoded by eight bits; and
field Sequence Number contains a sequence number used by the electronic mobile device which receives the message to avoid message duplication, the sequence number being conveniently encoded by thirty-two bits.

Figure 7:
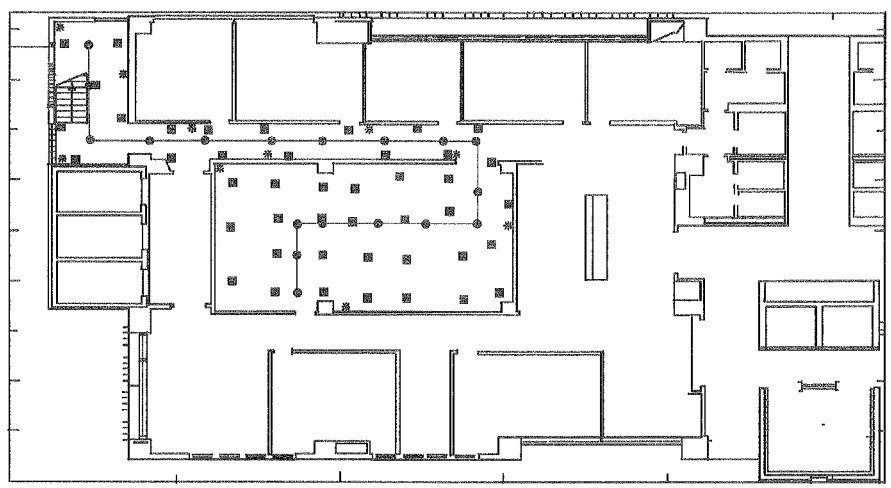
FIG. 7 shows an indoor environment wherein the indoor localization system according to the present invention has been tested.

FIG. 7 shows an indoor environment wherein the indoor localization system according to the present invention has been tested.

The indoor environment shown in FIG. 7 represents a typical modern office building scenario characterized by small rooms placed along long corridors and comprising small/medium-size walls.

In FIG. 7 an example of location estimation is also shown.

In detail, in FIG. 7 square dots represent the known reference positions, round dots represent electronic mobile device's locations estimated by the indoor localization system, and star-shaped dots represent the RF transmitting nodes.

The performances of the indoor localization system according to the present invention have been analysed considering an error function $f(x_i, y_i, z_i)$ defined as follows:

$$f(x_i, y_i, z_i) = \sqrt{(x_i - x'_i)^2 + (y_i + y'_i)^2 + (z_i - z'_i)^2}$$

wherein $(x_i, y_i, z_i)$ is the real position of the electronic mobile device and $(x'_i, y'_i, z'_i)$ is the electronic mobile device's location estimated by the indoor localization system.

Many tests have been performed by the Applicant varying some parameters, such as number of the RF transmitting nodes, the known reference positions and radio propagation characteristics of the indoor environment.

In particular, during testing many different paths of the electronic mobile device to be located have been taken into account, and each known reference position has been chosen so that it could see at least three different RF transmitting nodes.

Moreover, for each test the cumulative distribution function of error, the mean error, and the standard deviation of the error function $f(x_i, y_i, z_i)$ have been computed.

Figure 8:
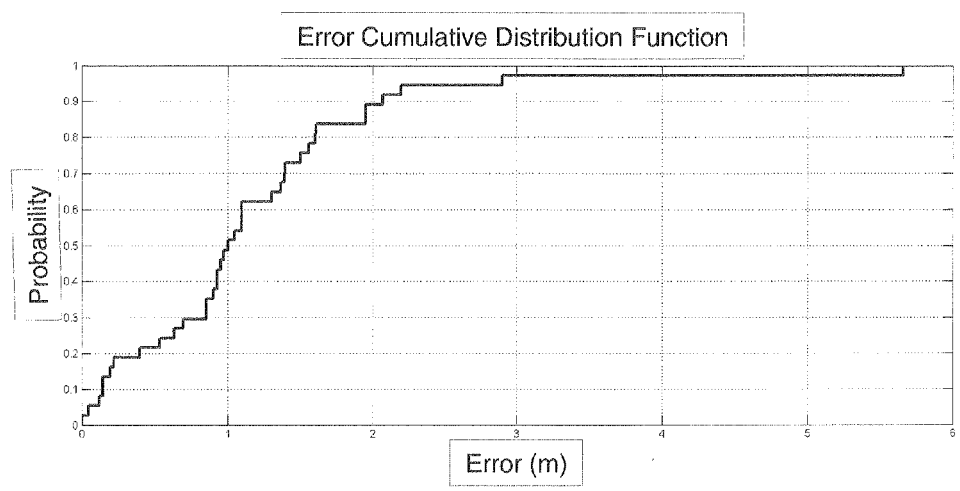
FIG. 8 shows an error cumulative distribution function computed for a test performed on the indoor localization system according to the present invention.

In particular, FIG. 8 shows an example of the cumulative distribution function of error computed for one typical test performed.

As it can be noted in FIG. 8, the indoor localization system according to the present invention is able to guarantee a location estimation accuracy of 1.3 m with a probability of 67%.

From the foregoing, it may be immediately appreciated that the indoor localization system according to the present invention suffers less from the variability of the RF signal and achieves a greater location estimation accuracy than the known RF-based localization systems.

Furthermore, it may be useful to point out that the present invention may be advantageously exploited in indoor emergency scenarios, where people or goods are to be recovered, as well in order to provide context-aware services, which, generally, exploit information about user's context to provide improved services based on user's position.

Examples of context-aware services based on user's position are telephone follow-me, which forwards phone calls to the user's current location, everywhere printing, which chooses the nearest printer for mobile users, and intelligent tourist, which offers help information based on a tourist's location.

Finally, it is clear that numerous modifications and variants can be made to the present invention, all falling within the scope of the invention, as defined in the appended claims.

The invention claimed is:

1. An indoor localization system for locating an electronic mobile device within an indoor environment, the indoor localization system comprising:
a plurality of transmitting nodes arranged in different positions within the indoor environment and configured to transmit RF signals; and
the electronic mobile device configured to receive the RF signals from the transmitting nodes;
the indoor localization system being configured to operate in:
a training mode, in which the electronic mobile device is operable to compute reference quantities based on powers of the RF signals received from the transmitting nodes in different reference positions within the indoor environment; and
a locating mode, in which the electronic mobile device is operable to compute current quantities based on the powers of the RF signals received from the transmitting nodes in its current location within the indoor environment, and in which the current location of the electronic mobile device is determined based on the current and the reference quantities;
wherein the plurality of transmitting nodes are operable, in both the training and the locating modes, to transmit the RF signals over at least two different radio channels;
wherein the electronic mobile device is operable in the training mode to compute, for each reference position and each of the at least two different radio channels, corresponding reference quantities based on the RF signals received by the electronic mobile device in said reference position from the transmitting nodes over said radio channel; and
wherein the electronic mobile device is operable in the locating mode to compute, for each of the at least two different radio channels, corresponding current quantities based on the RF signals received by the electronic mobile device in its current location from the transmitting nodes over said radio channel.

2. The indoor localization system according to claim 1, wherein the electronic mobile device is further configured to: store the reference quantities computed in the training mode; and in the locating mode, determine its current location based on the current and the reference quantities.

3. The indoor localization system according to claim 1, further comprising a central processing unit coupled to the electronic mobile device which is further configured to provide the central processing unit with the reference quantities in the training mode and with the current quantities in the locating mode; the central processing unit being configured to: store the reference quantities computed in the training mode; and in the locating mode, determine the current location of the electronic mobile device based on the current and the reference quantities.

4. The indoor localization system according to claim 1, further comprising a central processing unit coupled to the electronic mobile device which is further configured to provide the central processing unit with the reference quantities in the training mode and with the current quantities in the locating mode; the central processing unit being configured to:
in the training mode, create and store an RF map, said RF map comprising for each reference position corresponding reference quantity vectors each comprising the reference quantities computed by the electronic mobile device based on the powers of the RF signals received by said electronic mobile device in the reference position from the transmitting nodes over a corresponding radio channel;
in the locating mode, form current quantity vectors, each current quantity vector comprising the current quantities computed by the electronic mobile device based on the powers of the RF signals received by said electronic mobile device in its current location from the transmitting nodes over a corresponding radio channel;
in the locating mode, determine at least one reference position whose corresponding reference quantity vectors meet the given relation with the current quantity vectors; and
in the locating mode, determine the current location of the electronic mobile device based on the at least one determined reference position.

5. The indoor localization system according to claim 4, wherein the RF map is created based on a database which comprises a plurality of tuples, each tuple storing:
a corresponding reference quantity;
an identity of the transmitting node which has transmitted the RF signal based on which the electronic mobile device has computed the corresponding reference quantity;
an indicator of the radio channel over which the electronic mobile device has received the RF signal based on which the electronic mobile device has computed the corresponding reference quantity; and
spatial coordinates of the reference position in which the electronic mobile device has received the RF signal based on which the electronic mobile device has computed the corresponding reference quantity.

6. The indoor localization system according to claim 5, wherein the at least one reference position whose corresponding reference quantity vectors meet the given relation with the current quantity vectors is determined based on computing for each reference position respective Euclidean distances, each of which is computed between a corresponding current quantity vector comprising the current quantities computed by the electronic mobile device based on the powers of the RF signals received by the electronic mobile device over a respective radio channel, and a corresponding reference quantity vector which comprises the reference quantities computed by the electronic mobile device based on the powers of the RF signals received by the electronic mobile device in the reference position over the respective radio channel.

7. The indoor localization system according to claim 6, wherein the current location of the electronic mobile device is estimated to be that reference position for which is computed the smallest Euclidean distance among all the computed Euclidean distances.

8. The indoor localization system according to claim 6, wherein for each reference position a distance indicator parameter is computed based on the Euclidean distances computed for the reference position, the current location of the electronic mobile device being estimated to be that reference position for which is computed the smallest distance indicator parameter among all the computed distance indicator parameters.

9. The indoor localization system according to claim 6, wherein a first subset of the reference positions is identified, the reference positions belonging to the first subset being those reference positions for which are computed the smallest Euclidean distances among all the computed Euclidean distances, the current location of the electronic mobile device being estimated to be a geographic centroid of the reference positions belonging to the first subset.

10. The indoor localization system according to claim 6, wherein for each reference position a distance indicator parameter is computed based on the Euclidean distances computed for the reference position, and wherein a second subset of the reference positions is identified, the reference positions belonging to the second subset being those reference positions for which are computed the smallest distance indicator parameters among all the computed distance indicator parameters, the current location of the electronic mobile device being estimated to be a geographic centroid of the reference positions belonging to the second subset.

11. The indoor localization system according to claim 8, wherein the distance indicator parameter computed for each reference position is the sum of all the Euclidean distances computed for the reference position.

12. The indoor localization system according to claim 1, wherein the electronic mobile device comprises a first channel selector configured to dynamically select one radio channel among the at least two different radio channels over which receive the RF signals from the transmitting nodes, and wherein each transmitting node comprises a corresponding second channel selector configured to dynamically select one radio channel among the at least two different radio channels over which transmit the RF signals.

13. The indoor localization system according to claim 12, wherein the first channel selector and the second channel selectors are configured to have one and the same pattern of selection of the at least two different radio channels, and to be synchronized on the same selected radio channel.

14. The indoor localization system according to claim 12, wherein the first channel selector is configured to select each radio channel for a listening time long enough to allow the second channel selectors to select the radio channel selected by the first channel selector.

15. The indoor localization system according to claim 1, wherein the electronic mobile device and the transmitting nodes are based on IEEE 802.15.4 standard.

16. An electronic mobile device for an indoor localization system, comprising:

means for receiving RF signals transmitted from a plurality of transmitting nodes over at least two different radio channels;

in a training mode, means for computing reference quantities based on powers of the RF signals received from the transmitting nodes in different reference positions within an indoor environment;

in a locating mode, means for computing current quantities based on the powers of the RF signals received from the transmitting nodes in its current location within the indoor environment, wherein the current location of the electronic mobile device is determined based on the current and the reference quantities;

in the training mode, means for computing, for each reference position and each of the at least two different radio channels, corresponding reference quantities based on the RF signals received by the electronic mobile device in said reference position from the transmitting nodes over said radio channel; and in the locating mode, means for computing, for each of the at least two different radio channels, corresponding current quantities based on the RF signals received by the electronic mobile device in its current location from the transmitting nodes over said radio channel.

17. The indoor localization system according to claim 1, wherein the electronic mobile device is further configured to:
in the training mode, create and store an RF map of the indoor environment, said RF map comprising for each reference position corresponding reference quantity vectors each comprising the reference quantities computed based on the powers of the RF signals received by the electronic mobile device in the reference position from the transmitting nodes over a corresponding radio channel;

in the locating mode, form current quantity vectors, each current quantity vector comprising the current quantities computed based on the powers of the RF signals received by the electronic mobile device in its current location from the transmitting nodes over a corresponding radio channel;

in the locating mode, determine at least one reference position whose corresponding reference quantity vectors meet a given relation with the current quantity vectors; and in the location mode, determine its current location based on the at least one determined reference position.

\* \* \* \* \*